United States Patent [19]

Muramatsu et al.

[11] Patent Number: 5,098,072

[45] Date of Patent: Mar. 24, 1992

[54] FLUID-FILLED ELASTIC MOUNT HAVING TWO DIFFERENTLY TUNED ORIFICES AND MEANS FOR CONTROLLING PRESSURE IN AIR CHAMBER OR CHAMBERS ADJACENT TO EQUILIBRIUM CHAMBER OR CHAMBERS

[75] Inventors: Atsushi Muramatsu, Komaki; Yoshiki Funahashi, Iwakura, both of Japan

[73] Assignee: Tokai Rubber Industries, Ltd., Japan

[21] Appl. No.: 610,706

[22] Filed: Nov. 8, 1990

[30] Foreign Application Priority Data

Nov. 14, 1989 [JP] Japan .................. 1-295458

[51] Int. Cl.⁵ ........................................... F16M 1/00
[52] U.S. Cl. ..................... 267/140.1 C; 267/219; 267/141.2
[58] Field of Search ............. 267/140.1 C, 219, 141.2; 248/562, 636, 638; 180/300, 312

[56] References Cited

U.S. PATENT DOCUMENTS

| 4,690,389 | 9/1987 | West ..................... 267/140.1 |
| 4,871,151 | 10/1989 | Kanda ................... 267/140.1 C |
| 4,871,152 | 10/1989 | Funahashi ............. 248/562 |
| 4,919,400 | 4/1990 | Tabata et al. ........ 267/140.1 C |
| 4,923,178 | 5/1990 | Matsumoto et al. .. 267/140.1 C |
| 4,998,345 | 3/1991 | Funahashi et al. ... 267/140.1 C |

FOREIGN PATENT DOCUMENTS

| 3717026 | 12/1988 | Fed. Rep. of Germany ... 267/140.1 C |
| 0278639 | 12/1986 | Japan ..................... 248/562 |
| 62-196434 | 8/1987 | Japan . |
| 63-172035 | 7/1988 | Japan . |
| 63-176843 | 7/1988 | Japan . |

Primary Examiner—Joseph F. Peters, Jr.
Assistant Examiner—Christopher P. Ellis
Attorney, Agent, or Firm—Parkhurst, Wendel & Rossi

[57] ABSTRACT

A fluid-filled elastic mount including an elastic body interposed between an inner and an outer sleeve, a pressure-receiving chamber disposed between the two sleeves, a first and a second equilibrium chambers partially defined by respective flexible diaphragms for absorbing pressure chambes in the two equilibrium chambers: a first and a second air chamber corresponding to the first and second equilibrium chambers, for permitting elastic deformation of the respective diaphragms; and a first and a second orifice passage for fluid communication between the pressure-receiving and the first and the second equilibrium chambers. The second orifice passage has a ratio of its cross sectional area to its circumferential length, which is higher than that of the first orifice passage. The elastic mount further includes a pressure control device connected to the second air chamber for changing a pressure in the second air chamber. This pressure control device includes a switch device which is operable between a first position for communication of the second air chamber with a first pressure and a second position for communication of the second air chamber with a second pressure higher than the first pressure, so that the fluid flows only through the first orifice passage when the switch device is placed in the first position, and through the second orifice passage when the switch device is placed in the second position.

7 Claims, 7 Drawing Sheets

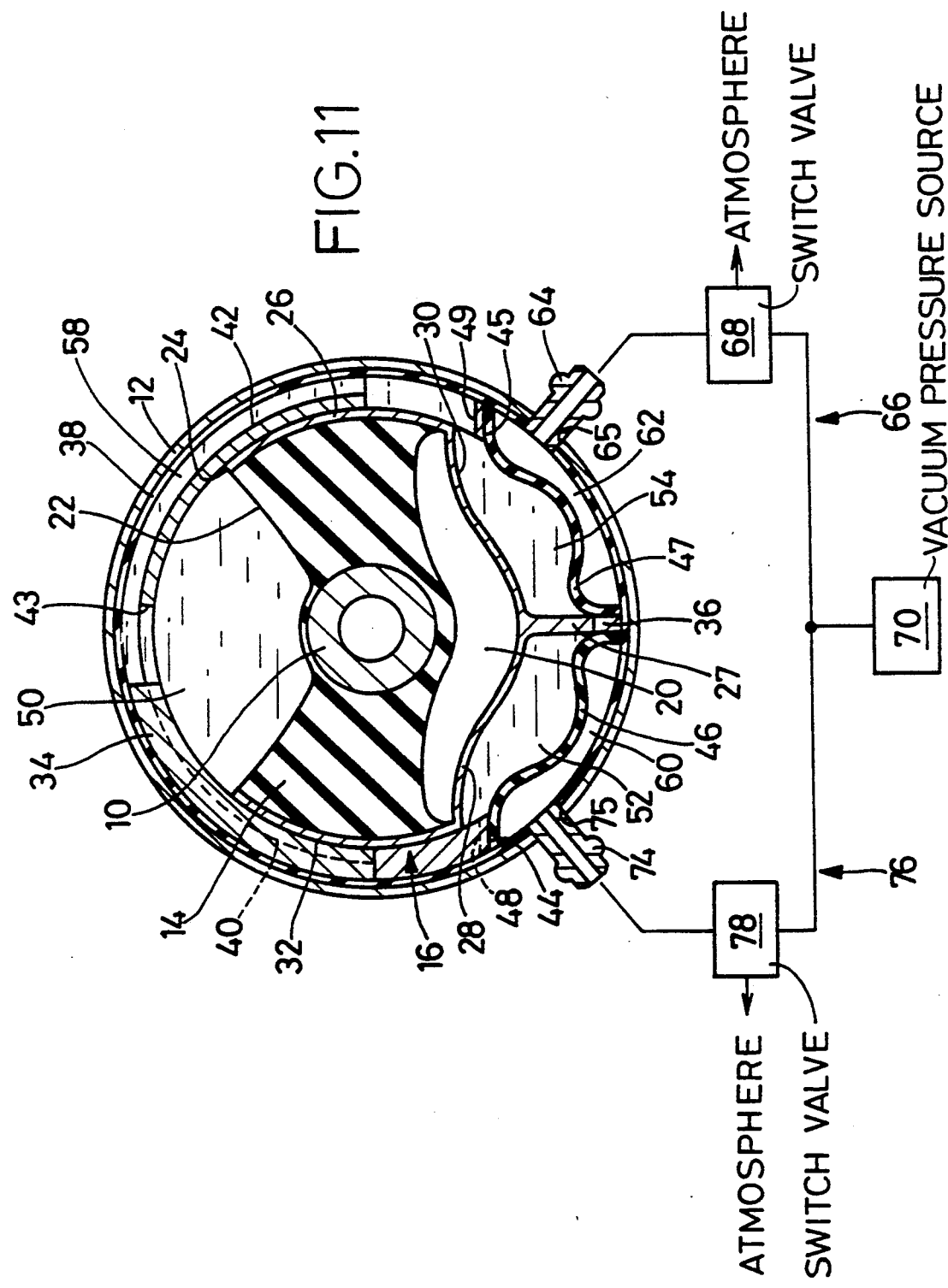

FLUID-FILLED ELASTIC MOUNT HAVING TWO DIFFERENTLY TUNED ORIFICES AND MEANS FOR CONTROLLING PRESSURE IN AIR CHAMBER OR CHAMBERS ADJACENT TO EQUILIBRIUM CHAMBER OR CHAMBERS

BACKGROUND OF THE INVENTION

1. Field of the Invention

The present invention relates in general to a fluid-filled cylindrical elastic mount for damping or isolating vibrations based on flows of a non-compressible fluid contained therein. More particularly, the present invention is concerned with such a fluid-filled elastic mount which is capable of exhibiting different vibration damping or isolating characteristics depending upon the type of the vibrations applied thereto.

2. Discussion of the Prior Art

A cylindrical elastic mount is known, as a vibration damping member interposed between two members of a vibration system, for flexibly connecting these two members. In this type of elastic mount, an inner sleeve and an outer sleeve which are radially spaced apart from each other by a given radial distance are elastically connected by an elastic body interposed therebetween. The elastic mount is adapted to damp or isolate vibrations which are applied between the inner and outer sleeves primarily in a diametric direction of the sleeves. This type of cylindrical elastic mount can be made relatively compact and small-sized, and can be readily designed for a comparatively reduced amount of relative radial displacement between the inner and outer sleeves upon application of even an excessively large vibrational load. For these reasons, the cylindrical elastic mount has been widely used as an engine mount, a differential gear mount and a suspension bushing for automotive vehicles.

Recently, there has been proposed a so-called fluid-filled cylindrical elastic mount having a plurality of fluid chambers which are formed between the inner and outer sleeves and which communicate with each other through an orifice passage, as disclosed in laid-open Publication Nos. 62-196434 and 63-172035 of unexamined Japanese patent applications, and U.S. Pat. No. 4,690,389. In this fluid-filled elastic mount, a non-compressible fluid filling the fluid chambers is forced to flow therebetween through the orifice passage, based on relative pressure changes in the fluid chambers which occur when a vibrational load is applied between the inner and outer sleeves The fluid-filled elastic mount which damps or isolates the applied vibrations based on the resonance of the fluid mass flow through the orifice passage is more effective than the elastic mount which relies on only the elasticity of the elastic body for damping the vibrations.

In the fluid-filled cylindrical elastic mount of the type indicated above, however, an improvement in the vibration damping/isolating function based on the resonance of the fluid is provided with respect to only the vibrations whose frequencies are in the neighborhood of the frequency to which the orifice passage is tuned. For instance, the orifice passage may be tuned to effectively provide a high damping effect with respect to relatively low-frequency vibrations based on the fluid resonance. In this case, the orifice passage operates as if it were substantially closed when the frequency of the input vibration is higher than the tuned frequency of the orifice passage. Accordingly, the elastic mount exhibits an excessively high dynamic spring constant, i.e., considerably lowered vibration isolating or damping effect, with respect to the input vibration having a relatively high frequency.

In view of the above drawback of the fluid-filled cylindrical elastic mount, it is proposed to provide two independently formed orifice passages, one of which is tuned to provide a sufficiently reduced dynamic spring constant so as to isolate the high-frequency vibrations, and the other of which is tuned to provide an excellent damping effect for the low-frequency vibrations.

One of the two above-indicated differently tuned orifice passages is tuned so that the resonance frequency of the fluid flowing therethrough becomes higher than that of the fluid flowing through the other orifice passage, and so that the flow resistance of the fluid in the one orifice passage becomes smaller than that of the fluid in the other orifice passage Therefore, the fluid filling the elastic mount is unlikely to flow through the other orifice passage having relatively high flow resistance of the fluid. Consequently, it is rather difficult to ensure a sufficient amount of the fluid flowing through the other orifice passage so as to effectively damp the low-frequency vibrations.

To solve the above-described problem, it is proposed to provide a control valve for selectively opening and closing the above-indicated one orifice passage tuned to the higher resonance frequency, depending upon the type of the input vibration, as disclosed in laid-open Publication No. 63-176843 of unexamined Japanese patent application. The control valve is operated by a suitable actuator, so that the above-indicated one orifice passage is automatically opened and closed to permit the elastic mount to exhibit different vibration isolating or damping characteristics, depending upon the type of the input vibration.

In the thus constructed fluid-filled cylindrical elastic mount, however, the use of the control valve disposed within the relevant orifice passage, and the actuator disposed within the elastic mount results in increased structural complexity and comparatively large size of the elastic mount. Accordingly, the cost of manufacture of the elastic mount is considerably increased.

SUMMARY OF THE INVENTION

It is therefore an object of the present invention to provide a fluid-filled cylindrical elastic mount which is simple in construction and which is capable of selectively allowing or inhibiting flows of a non-compressible fluid through one of two differently tuned orifice passages which is tuned to isolate relatively high-frequency vibrations, so as to exhibit different vibration isolating or damping characteristics based on resonance of the fluid flowing through a selected one of the two orifice passages, depending upon the type of the input vibration.

A fluid-filled elastic mount for flexibly connecting two members, comprising: (a) an inner and an outer sleeve which are spaced apart from each other in a radial direction thereof and to which the two members are fixed, respectively; (b) an elastic body interposed between the inner and outer sleeves, for elastically connecting the inner and outer sleeves, the elastic body at least partially defining a pressure-receiving chamber disposed between the inner and outer sleeves and filled with a non-compressible fluid, so that a pressure of the fluid in the pressure-receiving chamber changes due to elastic deformation of the elastic body upon application of a vibrational load between the inner and outer sleeves; (c) means for defining a first variable-volume equilibrium chamber disposed between the inner and outer sleeves and spaced from the pressure-receiving chamber in a circumferential direction of the inner and outer sleeves, the first equilibrium chamber being filled with the non-compressible fluid, the means for defining a first variable-volume equilibrium chamber including a first flexible diaphragm which is elastically deformable so as to absorb a change in a pressure of the fluid within the first equilibrium chamber, the outer sleeve and the first flexible diaphragm cooperating with each other to define a first air chamber which is separated from the first equilibrium chamber by the first flexible diaphragm, for permitting the first flexible diaphragm to elastically deform toward the outer sleeve; (d) means for defining a first orifice passage for fluid communication between the pressure-receiving and first equilibrium chambers to permit flows of the fluid therebetween; (e) means for defining a second variable-volume equilibrium chamber disposed between the inner and outer sleeves and spaced from the pressure-receiving chamber and the first equilibrium chamber in a circumferential direction of the inner and outer sleeves, the second equilibrium chamber being filled with the non-compressible fluid, the means for defining a second variable-volume equilibrium chamber including a second flexible diaphragm which is elastically deformable so as to absorb a change in a pressure of the fluid within the second equilibrium chamber, the outer sleeve and the second flexible diaphragm cooperating with each other to define a second air chamber which is separated from the second equilibrium chamber by the second flexible diaphragm, for permitting the second flexible diaphragm to elastically deform toward the outer sleeve; (f) means for defining a second orifice passage for fluid communication between the pressure-receiving and second equilibrium chambers to permit flows of the fluid therebetween, the second orifice passage having a ratio of a cross sectional area thereof to a circumferential length thereof as viewed in a circumferential direction of the mount, which ratio is higher than that of the first orifice passage; (g) pressure control means connected to the second air chamber for changing a pressure in the second air chamber. The pressure control means includes switching means which is operable between a first position for communication of the second air chamber with a first pressure and a second position for communication of the second air chamber with a second pressure, the first pressure being lower than the second pressure. Upon application of a vibrational load, the non-compressible fluid flows substantially exclusively through the first orifice passage when the switching means is placed in the first position, and through the second orifice passage when the switching means is placed in the second position.

In the fluid-filled elastic mount of the present invention constructed as described above, the non-compressible fluid filling the elastic mount is caused to flow through a selected one of the first and second orifice passages which are tuned to different resonance frequencies, by selectively applying the first or second pressure to the second air chamber which is separated from the second equilibrium chamber by the second diaphragm. Thus, the present elastic mount having a simple construction is capable of exhibiting a suitable vibration isolating or damping characteristic based on resonance of the fluid flowing through the selected one of the two orifice passages, depending upon the type of the input vibration.

The pressure control means may also be connected to the first air chamber for changing a pressure in the first air chamber. In this case, the pressure control means includes another switching means which is operable between a first position for communication of the first air chamber with the first pressure, and a second position for communication of the first air chamber lower than the second pressure. Upon application of a vibrational load, the non-compressible fluid flows substantially exclusively through the first orifice passage when the above-indicated switching means is placed in the first position while the above-indicated another switching means is placed in the second position, and through the second orifice passage when the switching means is placed in the second position while another switching means is placed in the first position.

According to the above arrangement of the invention, the pressure in the first air chamber separated from the first equilibrium chamber by the first diaphragm can be readily changed by selectively applying the first or second pressure to the first air chamber by the pressure control means. When the first air chamber is held in communication with the first pressure lower than the atmospheric pressure, the fluid flow through the first orifice passage is substantially inhibited, assuring a sufficient amount of the fluid flowing through the second orifice passage. This permits the elastic mount to more effectively isolate relatively high-frequency vibrations based on the resonance of the fluid mass flow through the second orifice passage, as compared with the elastic mount in which the first air chamber is not connected to the pressure control means.

BRIEF DESCRIPTION OF THE DRAWINGS

The above and optional objects, features and advantages of the present invention will become more apparent by reading the following detailed description of some presently preferred embodiments of the invention, when considered in conjunction with the accompanying drawings, in which:

FIG. 11 is a transverse cross sectional view of a vehicle engine mount constructed according to another embodiment of the invention.

DETAILED DESCRIPTION OF THE PREFERRED EMBODIMENTS

Figure 1:
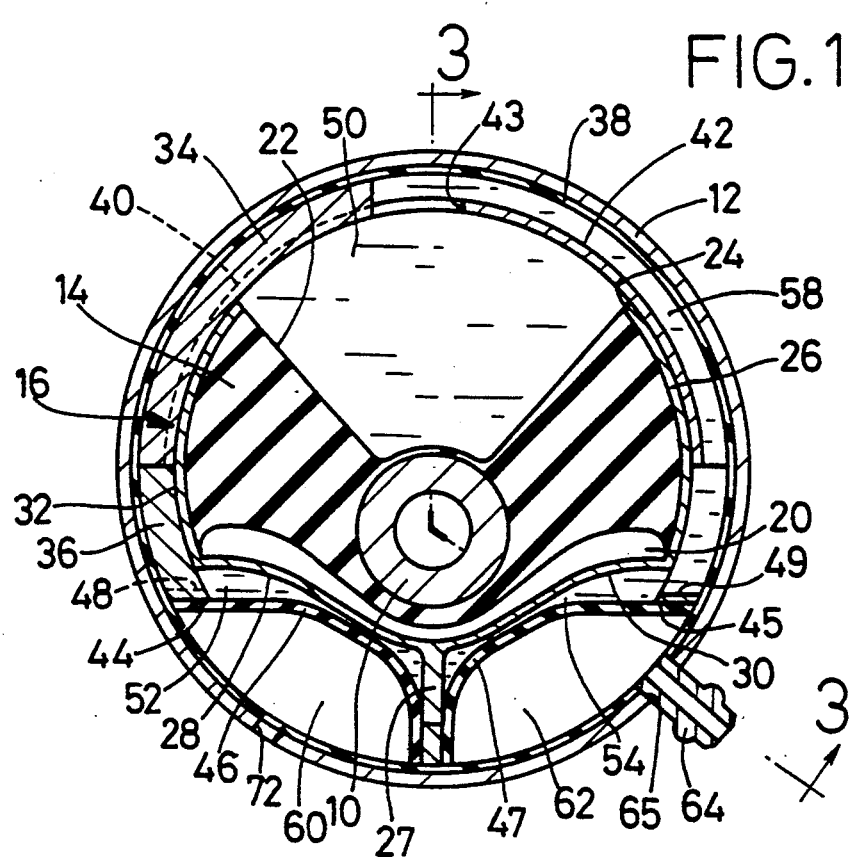
FIG. 1 is an elevational view in transverse cross section of one embodiment of the present invention, in the form of an engine mount used for a motor vehicle.
Figure 2:
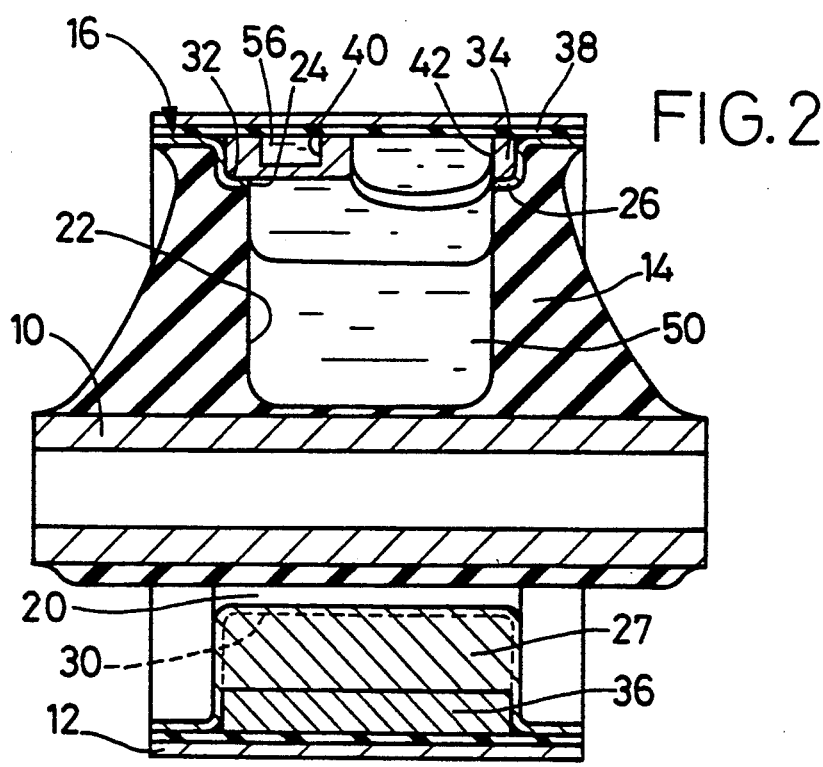
FIG. 2 is an axial cross sectional view of the engine mount of FIG. 1.
Figure 3:
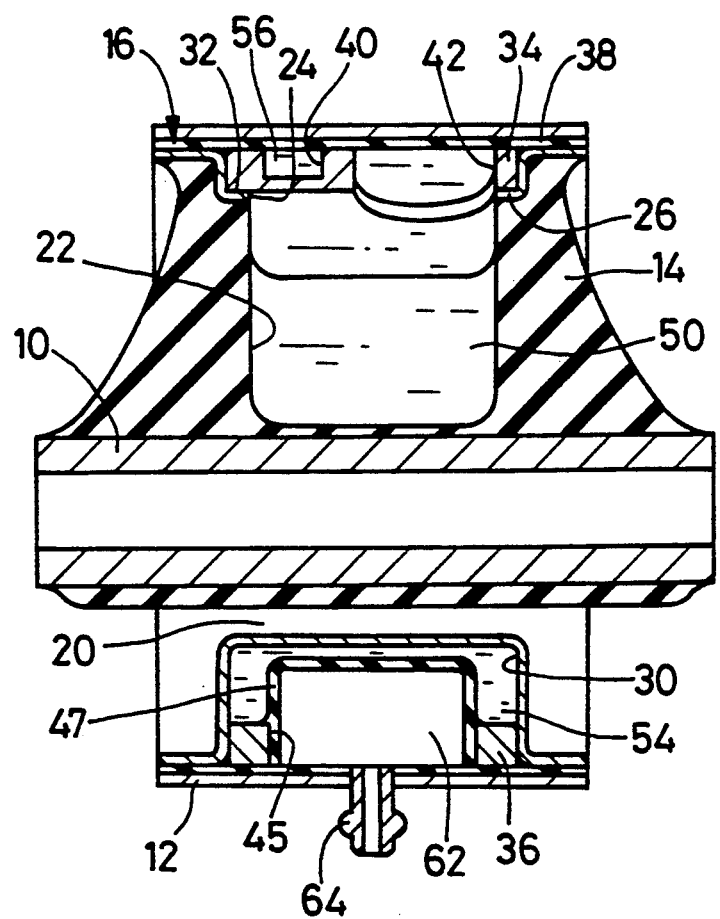
FIG. 3 is a cross sectional view taken along line 3—3 of FIG. 1.
Figure 10:
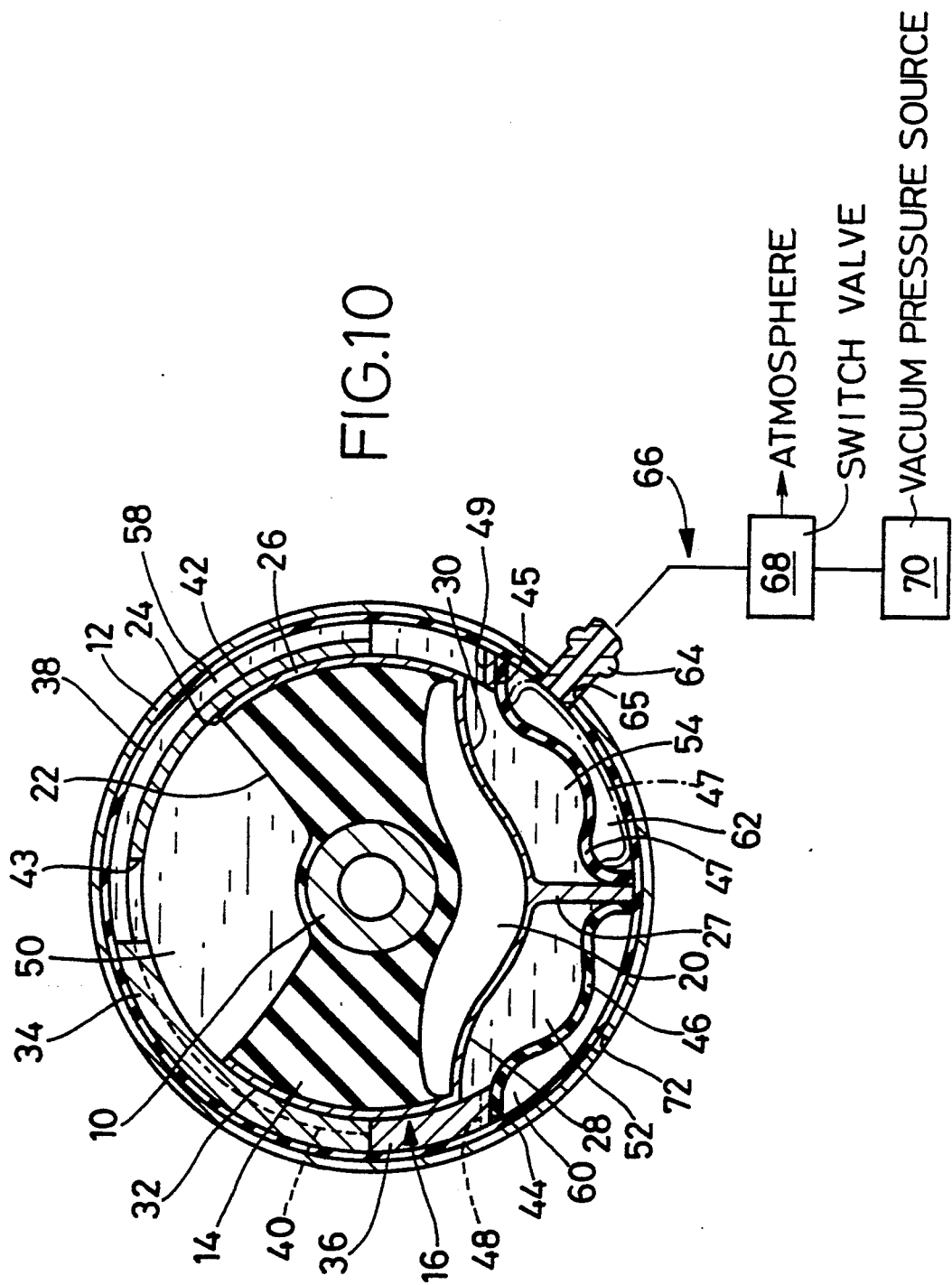
FIG. 10 is a transverse cross sectional view of the engine mount of FIG. 1 when it is installed on the motor vehicle.

Referring first to FIGS. 1 through 3, there is shown a fluid-filled cylindrical elastic engine mount for a motor vehicle, which is constructed according to the present invention. In these figures, reference numeral 10 denotes an inner sleeve which is made of a suitable metallic material. Radially outwardly of this inner sleeve 10, there is disposed an outer sleeve 12 such that the two sleeves 10, 12 are radially spaced apart from each other in an eccentric relation with a suitable radial offset distance. Between the inner and outer sleeves 10, 12, there is interposed an elastic body 14 so as to elastically connect the two sleeves 10, 12. The engine mount is installed on the vehicle such that an engine unit of the vehicle is fixed to the outer sleeve 12 while the vehicle body is secured to the inner sleeve 10, so that the engine unit is flexibly supported by the vehicle body so as to damp or isolate vibrations. With the weight of the engine unit acting on the outer sleeve 12 in the vertical direction in which the two sleeves 10, 12 are eccentric with each other, the two sleeves 10, 12 are held in a substantially concentric or coaxial relationship with each other, due to elastic deformation of the elastic body 14, as shown in FIG. 10. In this condition, the engine mount functions to damp or isolate vibrations received primarily in the direction of eccentric offset of the two sleeves 10, 12, i.e., in the vertical direction as seen in FIG. 1. This direction will be referred to as "load-receiving direction" where appropriate.

Figure 4:
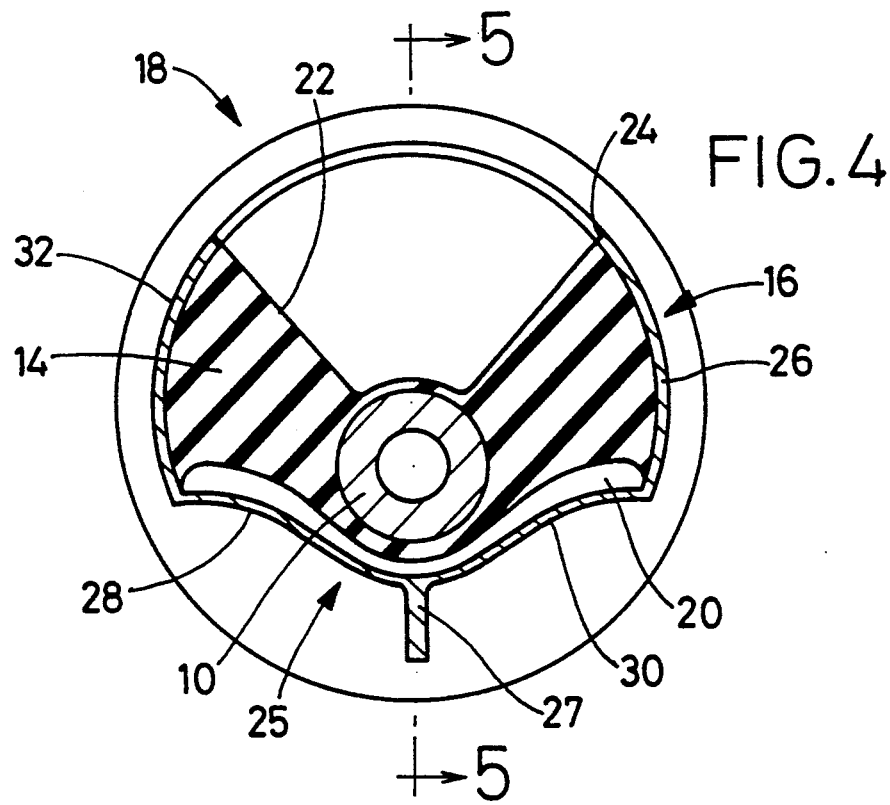
FIG. 4 is a transverse cross sectional view of an inner unit of the engine mount of FIG. 1, which is prepared by vulcanizing an elastic body between an inner and an intermediate sleeve.
Figure 5:
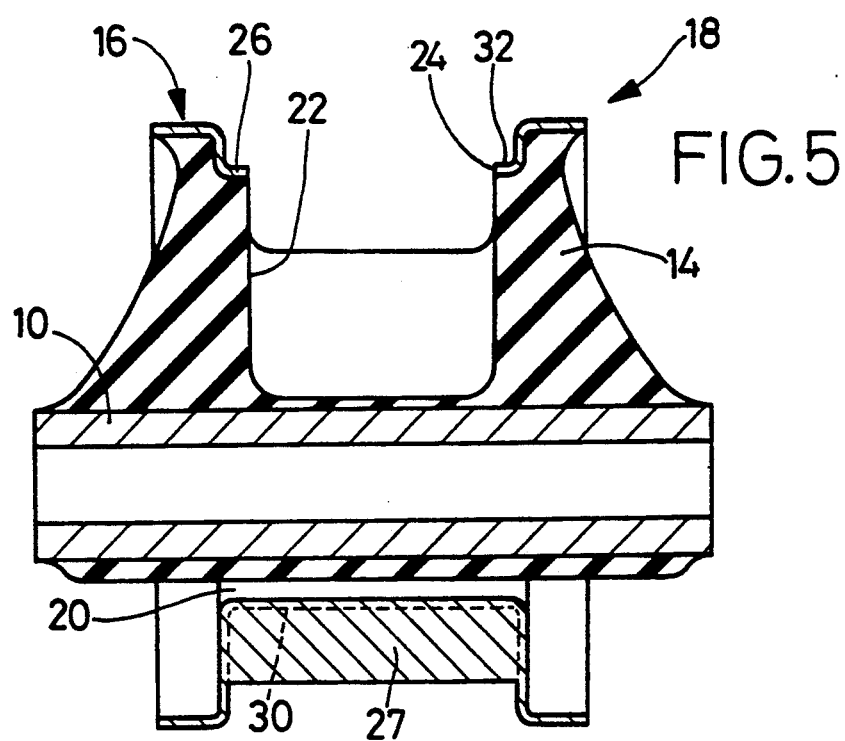
FIG. 5 - is a cross sectional view taken along line 5—5 of FIG. 4.

More specifically described referring to FIGS. 4 and 5, the inner sleeve 10 is a cylindrical member having a relatively large wall thickness. Radially outwardly of the inner sleeve 10, there is disposed an intermediate sleeve 16 which is a generally cylindrical metallic member having a relatively small wall thickness, such that the inner and intermediate sleeves 10, 16 are eccentric with each other by a suitable radial offset distance in the load-receiving direction.

The inner and intermediate sleeves 10, 16 are flexibly connected to each other by the elastic body 14 formed therebetween. The elastic body 14 is formed by vulcanization such that the elastic body 14 is bonded to the outer and inner surfaces of the inner and intermediate sleeves 10, 16, respectively, so as to provide an inner unit 18 as shown in FIGS. 4 and 5. Between the intermediate sleeve 16 and the elastic body 14, there is defined an axial void 20 formed in the axial direction of the mount. As indicated in FIGS. 1 and 4, this axial void 20 is located on one of diametrically opposite sides of the inner sleeve 10 as viewed in the load-receiving direction, on which the radial distance between the inner and intermediate sleeves 10, 16 is smaller than that on the other side. The axial void 20 has a generally arcuate shape as seen in the plane of FIG. 4, which corresponds to about a half of the circumference of the sleeves 10, 16. In the presence of the axial void 20, the elastic body 14 is present only on the above-indicated other side on which the above-indicated radial distance is larger, that is, only in the generally upper part of the space within the intermediate sleeve 16 as viewed in FIG. 4. The axial void 20 thus functions to reduce or prevent a tensile strain of the elastic body 14 caused by the weight of the engine unit exerted thereto through the outer sleeve 12, with the engine mount installed on the vehicle as described above.

The elastic body 14 has a pocket 22 in the form of a recess open to the outer circumferential surface, and the intermediate sleeve 16 has a window 24 aligned with the opening of the pocket 22, so that the pocket 22 is open on the outer surface of the intermediate sleeve 16. The pocket 22 and the window 24 are formed in respective portions of the elastic body 14 and the sleeve 16 which are located opposite to the axial void 20 in the diametrical direction of the inner sleeve 10. Namely, the pocket and window 22, 24 are positioned on the side of the inner sleeve 10 on which the radial distance between the inner and intermediate sleeves 10, 16 is relatively large.

As shown in FIG. 5, the intermediate sleeve 16 of the inner unit 18 has an axially intermediate portion 26 which has a smaller diameter than the other portion. This axially intermediate small-diameter portion 26 extends over the entire circumference of the sleeve 16, and has a relatively large axial length. The axially intermediate portion 26 has a recess 25 formed over a circumferential length corresponding to that of the arc of the axial void 20, as shown in FIG. 4. Namely, the lower part of the axially intermediate portion 26 as viewed in FIG. 4 is radially inwardly recessed as compared with the other portion of the axially intermediate portion 26, so that the bottom wall of the recess 25 cooperates with the elastic body 14 to define the axial void 18. At the center of the recess 25 as viewed in the circumferential direction of the mount, the intermediate sleeve 16 is formed with a partition wall 27 which protrudes radially outwards from the bottom wall of the recess 25 so as to extend over the entire axial length of the recess 25. This partition wall 27 divides the recess 25 into circumferentially spaced-apart first and second recessed sections 28, 30, which are respectively open on the corresponding portions of the outer surface of the inner unit 18. Between the opposite circumferential ends of the first and second recessed sections 28, 30, there is formed a part-circumferential groove 32 whose bottom is defined by the above-indicated other portion of the axially intermediate portion 26 of the intermediate sleeve 16. Namely, the part-circumferential groove 32 communicates at its circumferentially opposite ends with the first and second recessed sections 28, 30, respectively. Thus, the first and second recessed sections 28, 30 and the part-circumferential groove 32 cover the entire circumference of the intermediate sleeve 16.

Figure 7:
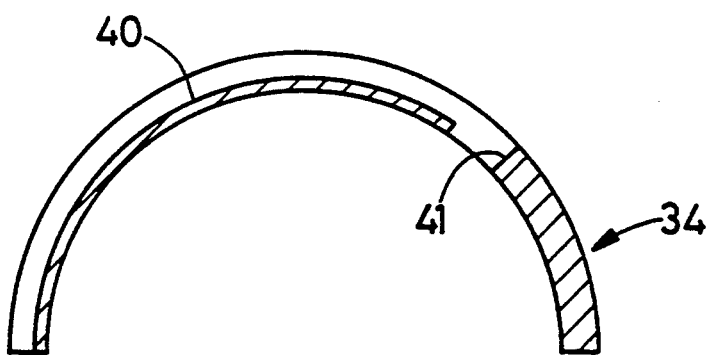
FIG. 7 is a cross sectional view taken along line 7—7 of FIG. 6.
Figure 9:
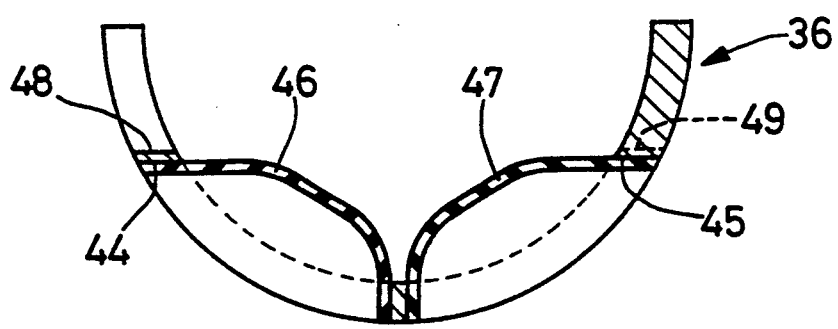
FIG. 9 is a cross sectional view taken along line 9—9 of FIG. 8.

The intermediate sleeve 16 of the thus constructed inner unit 18 shown in FIGS. 4 and 5 is subjected to a drawing operation to radially inwardly pre-compress the elastic body 14, as needed. Then, a first and a second orifice-defining member 34, 36 are fitted on the partcircumferential groove 32, as shown in FIGS. 1 through 3. The first and second orifice-defining members 34, 36 are substantially semi-cylindrical members as indicated in FIGS. 7 and 9, respectively. The first orifice-defining member 34 covers one half of the circumference of the intermediate sleeve 16 on the side of the window 24, while the second orifice-defining member 36 covers the other half on the side of the recess 25. Then, the outer sleeve 12 is fitted on the outer circumferential surfaces of the orifice-defining members 34, 36 and intermediate sleeve 16, and is subjected to a radially inward drawing operation. The outer sleeve 12 has a sealing rubber layer 38 formed on its inner circumferential surface, for providing fluid tightness between the inner surface of the outer sleeve 12 and the outer surfaces of the orifice-defining members 34, 36 and intermediate sleeve 16.

Figure 6:
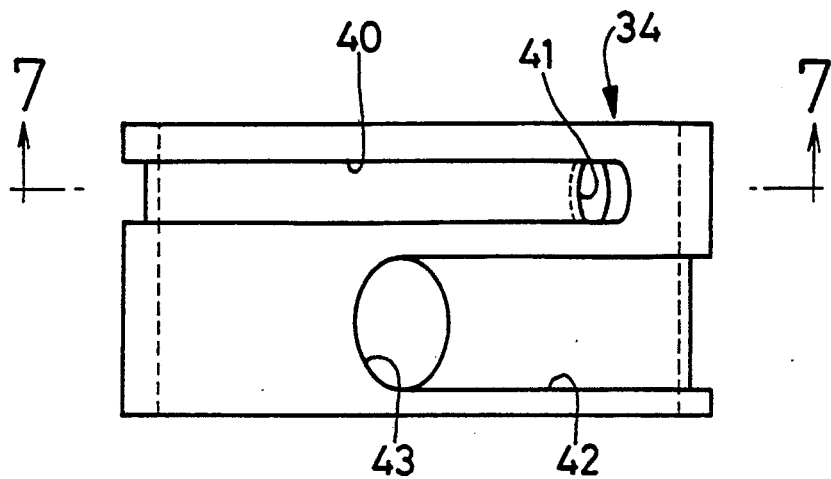
FIG. 6 is a plan view of a first orifice-defining member used in the engine mount of FIG. 1.

As shown in FIGS. 6 and 7, the first orifice-defining member 34 has a first and a second groove 40, 42 formed in the outer circumferential surface thereof. The first groove 40 extends over a predetermined circumferential length such that the outer end of the groove 40 is open at one of the opposite ends of the first orifice-defining member 34 as viewed in the circumferential direction of the engine mount while the inner end communicates with a first communication hole 41 formed through the wall thickness of the orifice-defining member 34. On the other hand, the second groove 42 extends over a predetermined circumferential length such that the outer end of the groove 42 is open at the other circumferential end of the first orifice-defining member 34 while the inner end communicates with a second communication hole 43 formed through the wall thickness of the orifice-defining member 34.

Figure 8:
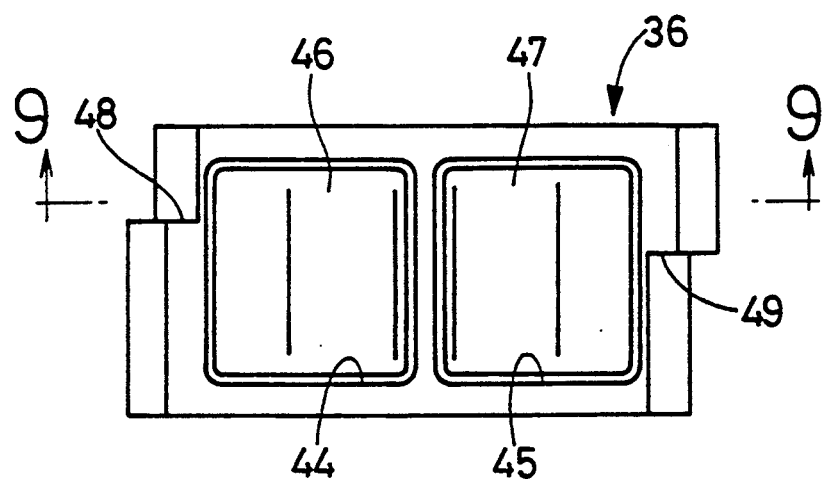
FIG. 8 is a plan view of a second orifice-defining member used in the engine mount of FIG. 1.

As shown in FIGS. 8 and 9, the second orifice-defining member 36 has a first and a second rectangular window 44, 45 formed at the intermediate portion as viewed in the circumferential direction thereof, such that the first and second windows 44, 45 are located at the openings of the first and second recessed sections 28, 30, respectively, with the second orifice-defining member 36 mounted on the inner unit 18 shown in FIG. 4. The second orifice-defining member 36 further has two cutouts 48, 49 at the circumferential opposite ends such that the first and second windows 44, 45 are located between the two cutouts 48, 49. These cutouts 48, 49 are connected to the above-indicated outer ends of the first and second grooves 40, 42 of the first orifice-defining member 34, with the first and second orifice-defining members 34, 36 mounted on the inner unit 18. This second orifice-defining member 36 is provided with a first and a second elastically deformable or flexible diaphragm 46, 47, which are secured at their peripheries to respective inner walls of the first and second windows 44, 45, by means of vulcanization, so as to fluid-tightly close the openings of the first and second windows 44, 45, respectively. As seen in FIG. 9, the substantial portions of the two flexible diaphragms 46, 47 are positioned radially inwards of the second orifice-defining member 36.

With the first orifice-defining member 34 and the outer sleeve 12 mounted on the inner unit 18 of FIG. 4 and 5, the pocket 22 formed in the elastic body 14 is fluid-tightly closed, whereby a pressure-receiving chamber 50 corresponding to the pocket 22 is formed within the engine mount. The pressure-receiving chamber 50 is filled with a suitable non-compressible fluid as described later. Upon application of a vibrational load between the inner and outer sleeves 10, 12, the pressure of the fluid in the chamber 50 is changed by elastic deformation of the elastic body 14 caused by the vibrational load.

With the second orifice-defining member 36 mounted on the inner unit 18 of FIG. 4 and 5, the openings of the first and second recessed sections 28, 30 are respectively covered and fluid-tightly closed by the first and second flexible diaphragms 46, 47 secured to the member 36, whereby a first and a second variable-volume equilibrium chamber 52, 54 corresponding to the first and second recessed sections 28, 30 are formed within the engine mount. The equilibrium chambers 52, 54 are also filled with the non-compressible fluid. Changes in the fluid pressure in the first and second equilibrium chambers 52, 54 are accommodated or absorbed by elastic deformation or displacement of the first and second flexible diaphragms 46, 47, respectively.

On one side of the first diaphragm 46 remote from the first equilibrium chamber 52, that is, between the first diaphragm 46 and the outer sleeve 12, there is defined a first air chamber 60 which functions to allow the diaphragm 46 to deform when the fluid pressure in the first equilibrium chamber 52 changes. Likewise, on one side of the second diaphragm 47 remote from the second equilibrium chamber 54, that is, between the second diaphragm 47 and the outer sleeve 12, there is defined a second air chamber 62 which functions to allow the diaphragm 47 to deform when the fluid pressure in the second equilibrium chamber 54 changes. The first and second air chambers 60, 62 are formed as fluid-tight spaces or enclosures within the engine mount. The first air chamber 60 is held in communication with the atmosphere, through a through hole 72 formed through the outer sleeve 12, while the second air chamber 62 communicates with an air conduit 66 shown in FIG. 10 (which will be described later), through a connector 64 whose end is fitted in a hole 65 formed through the outer sleeve 12.

The non-compressible fluid filling the pressure-receiving chamber 50 and the first and second equilibrium chambers 52, 54 may be water, alkylene glycol, polyalkylene glycol, silicone oil or a mixture thereof. The filling of the chambers 50, 52, 54 with the non-compressible fluid may be accomplished by mounting the outer sleeve 12 and the orifice-defining members 34, 36 on the inner unit 18 of FIGS. 4 and 5 within a mass of the selected fluid contained in a suitable vessel.

With the first orifice-defining member 34 disposed between the intermediate sleeve 16 and the outer sleeve 12, the first and second grooves 40, 42 are closed by the outer sleeve 12, and are held in fluid communication with the first and second equilibrium chambers 52, 54, respectively, through the respective cutouts 48, 49 formed through the second orifice-defining member 36. Namely, the pressure-receiving chamber 50 and the first equilibrium chamber 52 are held in fluid communication with each other through a first orifice passage 56 which is defined such that the first groove 40 communicating with the hole 41 and the cutout 48 is fluid-tightly closed by the sealing rubber layer 38 formed on the outer sleeve 12. Further, the pressure-receiving chamber 50 and the second equilibrium chamber 54 are held in fluid communication with each other through a second orifice passage 58 which is defined such that the second groove 42 communicating with the hole 43 and the cutout 49 is fluid-tightly closed by the sealing rubber layer 38 formed on the outer sleeve 12.

It will be understood from FIG. 6 that the second groove 42 providing the second orifice passage 58 has a larger cross sectional area and a shorter circumferential length than the first groove 40 providing the first orifice passage 56. That is, the ratio of the cross sectional area to the length with respect to the second orifice passage 58 is greater than that of the first orifice passage 56. Accordingly, the resonance frequency of the fluid flowing through the second orifice passage 58 is determined to be higher by a suitable value than that of the fluid flowing through the first orifice passage 56. In the instant embodiment, in particular, the first orifice passage 56 is tuned so that the engine mount exhibits a sufficiently high damping effect with respect to relatively low-frequency vibrations, such as engine shake or bounce. On the other hand, the second orifice passage 58 is tuned so that the engine mount exhibits a sufficiently reduced dynamic spring constant with respect to relatively high-frequency vibrations, such as engine idling vibrations.

The thus constructed engine mount is installed on the vehicle such that the inner sleeve 10 is fixed to the vehicle body while the outer sleeve 12 is fixed to the engine unit, so that the engine mount is interposed between the vehicle body and the engine unit with the weight of the engine unit acting between the inner and outer sleeve 10, 12, as shown in FIG. 10. In this condition, the air conduit 66 communicating with the second air chamber 62 through the connector 64 is connected to an air pressure source in the form of a vacuum pressure source 70 via switching means in the form of a switch valve 68. The switch valve 68 is electrically controlled so as to be selectively placed in a first position for communication of the second air chamber 62 with the atmosphere, and a second position for communication of the air chamber 62 with the vacuum pressure source 70.

When the second air chamber 62 is connected to the vacuum pressure source 70 through the air conduit 66 and switch valve 66, the pressure in the air chamber 62 is lowered below the atmospheric pressure, with a result of drawing the second diaphragm 47 toward the inner surface of the outer sleeve 12. Consequently, the second diaphragm 47 maintains an elastically deformed shape such that the outer surface of the the diaphragm 47 contacts the inner surface of the outer sleeve 12, as indicated by a one-dot chain line in FIG. 10, while the switch valve 68 is placed in the second position. In this condition, the second diaphragm 47 is prevented from being freely deformed or displaced so as to accommodate the pressure change in the second equilibrium chamber 54. While the volume of the second equilibrium chamber 54 increases with the second diaphragm 47 being sucked toward the inner surface of the outer sleeve 12, the increased volume of the chamber 54 is filled with the mass of the non-compressible fluid in the first equilibrium chamber 52, owing to the changeable volume of the first equilibrium chamber 52 partially defined by the first diaphragm 46 which is freely deformable.

Upon application of a vibrational load between the inner and outer sleeves 10, 12, the non-compressible fluid is forced to flow between the pressure-receiving chamber 50 and the first and second equilibrium chambers 52, 54, through the respective first and second orifice passages 56, 58, based on a pressure difference between the pressure-receiving chamber 50 and the first and second equilibrium chambers 52, 54. In the instant engine mount, the fluid is forced to flow through a selected one of the first and second orifice passages 56, 58, by placing the switch valve 68 selectively in the first position in which the second air chamber 62 is open to the atmosphere, and the second position in which the air chamber 62 is connected to the vacuum pressure source 70, so that the engine mount exhibits a desired vibration damping or isolating effect for the vibrations applied thereto, based on resonance of the fluid in the first or second orifice passage 56, 58.

As described above, the first orifice passage 56 is tuned so as to provide a sufficiently high damping effect of the mount with respect to the vibrations having a relatively low frequency, while the second orifice passage 58 is tuned to provide a sufficiently low dynamic spring constant of the mount with respect to the vibrations having a relatively high frequency. The vibration damping and isolating effects are based on the resonance of the fluid flowing through the first and second orifice passages 56, 58. As a result of tuning of the orifice passages 56, 58, the flow resistance of the first orifice passage 56 is greater than that of the second orifice passage 58. Therefore, when the switch valve 68 is placed in the first position, the pressure change in the pressure-receiving chamber 50 caused by the vibrations is likely to be eliminated only by fluid flow between the pressure-receiving and second equilibrium chambers 50, 54 through the second orifice passage 58 while the first and second orifice passages 56, 58 are held in fluid communication with each other. Namely, almost no fluid flow occurs through the first orifice passage 56, whereby the first orifice passage 56 is almost disabled to provide the vibration damping or isolating effect with respect to the low-frequency vibrations.

For the reasons as described above, when the engine mount receives relatively low-frequency vibrations such as engine shake or bounce, which should be damped by flows of the fluid through the first orifice passage 56, the switch valve 68 is operated to the second position for connecting the second air chamber 62 to the vacuum pressure source 70, so that the second diaphragm 47 is drawn toward the inner surface of the outer sleeve 12 and does not function to accommodate or absorb the change in the fluid pressure of the second equilibrium chamber 54. Consequently, the fluid is prevented from flowing through the second orifice passage 58, permitting the fluid to flow only through the first orifice passage 56, whereby the engine mount exhibits a high vibration damping or isolating effect with respect to the low-frequency vibrations, based on the resonance of the fluid flowing through the first orifice passage 56.

On the other hand, when the engine mount receives relatively high-frequency vibrations such as engine idling vibrations, which should be isolated by flows of the fluid through the second orifice passage 58, the switch valve 68 is operated to the first position for exposing the second air chamber 62 to the atmosphere, so as to permit the second diaphragm 47 to freely deform to accommodate the change in the fluid pressure in the second equilibrium chamber 54. Upon application of the high-frequency vibrations, therefore, effective flows of the fluid occur through the second orifice passage 58 due to the variable volume of the second equilibrium chamber 54, whereby the instant engine mount exhibits a high vibration isolating effect with respect to the high-frequency vibrations, based on the resonance of the fluid flowing through the second orifice passage 58. It is to be noted that since the flow resistance of the fluid in the first orifice passage 56 increases substantially when the mount receives such high-frequency vibrations, a sufficient amount of the fluid is caused to flow between the pressure-receiving chamber 50 and the second equilibrium chamber 54 through the second orifice passage 58, even though the first orifice passage 56 is held in fluid communication with the pressure-receiving chamber 50 and the first equilibrium chamber 52.

Thus, the present engine mount is adapted to control the switch valve 68 depending upon the running condition of the vehicle, so that the engine mount exhibits different operating characteristics suitable for effectively damping or isolating the input vibrations, assuring improved driving comfort of the vehicle. Namely, the switch valve 68 is controlled such that the second air chamber 62 is connected to the vacuum pressure source 70 while the vehicle is running, and such that the second air chamber 62 is exposed to the atmosphere when the vehicle is stopped with the idling engine. In this arrangement, the engine mount exhibits an excellent damping characteristic with respect to low-frequency vibrations such as engine shake or bounce, during running of the vehicle, based on the resonance of the fluid mass flow through the first orifice passage 56. At the same time, the engine mount exhibits a sufficiently low dynamic spring constant with respect to the engine idling vibrations when the vehicle is stopped, based on the resonance of the fluid mass flow through the second orifice passage 58.

In the engine mount constructed as described above, the non-compressible fluid within the engine mount is forced to flow selectively through the first or second orifice passage 56, 58, only by operating the switch valve 68 so as to control the pressure in the second air chamber 62. Thus, the present engine mount is comparatively simple in construction since the pressure control means (64, 66, 68, 70) for changing the pressure in the second air chamber 62 for providing the two different operating characteristics is almost entirely disposed outside the engine mount. That is, it is not necessary to provide the engine mount with a control valve for selectively opening and closing the two orifice passages and an actuator for operating the control valve, which are incorporated within the structure of the engine mount.

When the concept of the present invention is applied to a vehicle engine mount as in the illustrated embodiment, the intake side pressure of the vehicle engine can be readily utilized as the vacuum pressure applied to the second air chamber 62.

Referring next to FIG. 11, there is shown a vehicle engine mount constructed according to another embodiment of the invention. In the following description of the instant embodiment, the same numerals used in the preceding embodiment will be used for identifying structurally and functionally corresponding elements, and no detailed description of these elements will be provided.

The instant engine mount is constructed such that the first air chamber 60 communicates with an air conduit 76, through a connector 64 whose end is fitted in a hole 75 formed through the outer sleeve 12, so that the first air chamber 60 is also connected to the vacuum pressure source 70 through the air conduit 76 and a switch valve 78 similar to the switch valve 68. As in the preceding embodiment, the switch valve 78 is electrically controlled so as to be selectively placed in a first position for communication of the first air chamber 60 with the atmosphere, and a second position for communication of the air chamber 60 with the vacuum pressure source 70.

Where the instant engine mount constructed as described above receives relatively low-frequency vibrations which are effectively damped or isolated due to the fluid flow through the first orifice passage 56, the switch valve 78 is operated to the first position so that the first air chamber 60 is exposed to the atmosphere while the switch valve 68 is operated to the second position so that the second pressure chamber 62 is connected to the vacuum pressure source 70. As a result, the volumetric change in the second equilibrium chamber 54 is inhibited, preventing the fluid from flowing through the second orifice passage 58. Consequently, a sufficient amount of the fluid is forced to flow through the first orifice passage 56, so as to damp or isolate the low-frequency vibrations applied to the mount, based on the resonance of the fluid mass flow through the first orifice passage 56.

Where the instant engine mount receives relatively high-frequency vibrations which are effectively isolated due to fluid flow through the second orifice passage 58, the switch valve 78 is operated to the second position so that the first air chamber 60 is connected to the vacuum pressure source 70 while the switch valve 68 is operated to the first position so that the second air chamber 62 is exposed to the atmosphere. As a result, the pressure in the first air chamber 60 is lowered below the atmospheric pressure, with a result of sucking the first diaphragm 46 toward the inner surface of the outer sleeve 12. Consequently, the volumetric change in the first equilibrium chamber 52 is inhibited, thereby substantially preventing the fluid from flowing through the first orifice passage 56. This arrangement is more effective to assure a sufficient amount of the fluid which flows through the second orifice passage 58 upon application of the high-frequency vibrations, as compared with the engine mount of the first embodiment. Thus, the instant engine mount is able to more effectively provide a reduced dynamic spring constant with respect to the high-frequency vibrations, based on the resonance of the fluid mass flow through the second orifice passage 58, as compared with the engine mount of the first embodiment.

While the present invention has been described in its presently preferred embodiments with a certain degree of particularity, for illustrative purpose only, it is to be understood that the invention is not limited to the details of the illustrated embodiments.

The constructions and configurations of the first and second orifice passages may be suitably modified according to the required vibration isolating or damping characteristics.

While the pressure control means is adapted to control the pressure in an air chamber by communicating the air chamber selectively with the atmosphere or with the vacuum pressure source in the illustrated embodiments, the pressure control means according to the invention may use a pressure source for applying a pressure higher than the atmospheric pressure, in addition to the vacuum pressure source. In this case, the air chamber is connected to the pressure source instead of being exposed to the atmosphere, so that a predetermined level of pressure (higher than the atmospheric pressure) is applied to the air chamber. Alternatively, the air chamber may be fluid-tightly closed after being exposed to the atmosphere for a while, such that the pressure in the air chamber is substantially equal to the atmospheric pressure. In the above two cases, the diaphragm adjacent to the air chamber is permitted to be freely deformed according to the volumetric change in the corresponding equilibrium chamber, based on the compression of the air present in the air chamber.

While the illustrated embodiments of the invention are used as an engine mount for an automotive vehicle, the principle of the present invention is equally applicable to any fluid-filled elastic mounts other than the engine mount, for example, to a vehicle body mount, a cab mount, and a suspension bushing for the vehicles, and even applicable to fluid-filled vibration damping-/isolating components such as cylindrical dampers used for various devices or equipment other than those for automotive vehicles.

It is to be understood that the present invention may be embodied with various other changes, modifications and improvements, which may occur to those skilled in the art, without departing from the spirit and scope of the invention defined in the following claims.

What is claimed is:

1. A fluid-filled elastic mount for flexibly connecting two members, comprising:

an inner and an outer sleeve which are spaced apart from each other in a radial direction thereof and to which said two members are fixed, respectively;

an elastic body interposed between said inner and outer sleeves, for elastically connecting the inner and outer sleeves;

said elastic body at least partially defining a pressure-receiving chamber disposed between said inner and outer sleeves and filled with a non-compressible fluid, so that a pressure of said fluid in said pressure-receiving chamber changes due to elastic deformation of said elastic body upon application of a vibrational load between said inner and outer sleeves;

means for defining a first variable-volume equilibrium chamber disposed between said inner and outer sleeves and spaced from said pressure-receiving chamber in a circumferential direction of the inner and outer sleeves, said first equilibrium chamber being filled with said non-compressible fluid, said means for defining a first variable-volume equilibrium chamber including a first flexible diaphragm which is elastically deformable so as to absorb a change in a pressure of said fluid within said first equilibrium chamber;

said outer sleeve and said first flexible diaphragm cooperating with each other to define a first air chamber which is separated from said first equilibrium chamber by said first flexible diaphragm, for permitting the first flexible diaphragm to elastically deform toward said outer sleeve;

means for defining a first orifice passage for fluid communication between said pressure-receiving and first equilibrium chambers to permit flows of said fluid therebetween;

means for defining a second variable-volume equilibrium chamber disposed between said inner and outer sleeves and spaced from said pressure-receiving chamber and said first equilibrium chamber in a circumferential direction of the inner and outer sleeves, said second equilibrium chamber being filled with said non-compressible fluid, said means for defining a second variable-volume equilibrium chamber including a second flexible diaphragm which is elastically deformable so as to absorb a change in a pressure of said fluid within said second equilibrium chamber;

said outer sleeve and said second flexible diaphragm cooperating with each other to define a second air chamber which is separated from said second equilibrium chamber by said second flexible diaphragm, for permitting the second flexible diaphragm to elastically deform toward said outer sleeve;

means for defining a second orifice passage for fluid communication between said pressure-receiving and second equilibrium chambers to permit flows of said fluid therebetween, said second orifice passage having a ratio of a cross sectional area thereof to a circumferential length thereof as viewed in a circumferential direction of the mount, which ratio is higher than that of said first orifice passage;

pressure control means connected to said second air chamber for changing a pressure in said second air chamber, said pressure control means including a first switching means which is operable between a first position for communication of said second air chamber with a first pressure and a second position for communication of said second air chamber with a second pressure, said first pressure being lower than said second pressure, said non-compressible fluid flowing substantially exclusively through said first orifice passage when said first switching means is placed in said first position, and through said second orifice passage when said first switching means is placed in said second position.

2. A fluid-filled elastic mount according to claim 1, wherein said second air chamber is held in communication with an atmosphere having an atmospheric pressure as said second pressure when said first switching means is placed in said second position.

3. A fluid-filled elastic mount according to claim 2, wherein said pressure control means further includes a vacuum pressure source for providing said first pressure lower than the atmospheric pressure.

4. A fluid-filled elastic mount according to claim 1, wherein said outer sleeve has a hole communicating with said second air chamber, said pressure control means including an air conduit connected to said hole of said outer sleeve for changing the pressure in said second air chamber.

5. A fluid-filled elastic mount according to claim 4, wherein said air conduit is connected to said hole of said outer sleeve through a connector fitted in said hole of the outer sleeve.

6. A fluid-filled elastic mount according to claim 1, further comprising an intermediate sleeve disposed between said elastic body and said outer sleeve, said intermediate sleeve having a recessed portion which cooperates with said first and second flexible diaphragms to define said first and second equilibrium chambers, respectively, said recessed portion including a partition wall radially extending therefrom toward said outer sleeve, such that said first and second equilibrium chambers are disposed on opposite sides of said partition wall in said circumferential direction of the mount.

7. A fluid-filled elastic mount according to claim 1, wherein said pressure control means is also connected to said first air chamber to change a pressure in said first air chamber, said pressure control means including a second switching means which is operable between a first position for communication of said first air chamber with said first pressure and a second position for communication of said first air chamber with said second pressure, said non-compressible fluid flowing substantially exclusively through said first orifice passage when said first switching means is placed in said first position while said second switching means is placed in said second position, and through said second orifice passage when said first switching means is placed in said second position while said second switching means is placed in said first position.

* * * * *